United States Patent
Dempster

(10) Patent No.: US 11,221,597 B2
(45) Date of Patent: Jan. 11, 2022

(54) SYSTEMS AND METHODS FOR BALANCING AN ELECTRICAL GRID WITH NETWORKED BUILDINGS

(71) Applicant: OPTIMUM ENERGY LLC, Seattle, WA (US)

(72) Inventor: Ian Dempster, Seattle, WA (US)

(73) Assignee: OPTIMUM ENENRGY LLC, Seattle, WA (US)

( * ) Notice: Subject to any disclaimer, the term of this patent is extended or adjusted under 35 U.S.C. 154(b) by 404 days.

(21) Appl. No.: 15/593,094

(22) Filed: May 11, 2017

(65) Prior Publication Data

US 2017/0315580 A1 Nov. 2, 2017

Related U.S. Application Data

(63) Continuation of application No. 13/543,520, filed on Jul. 6, 2012, now abandoned.

(51) Int. Cl.
*G05B 15/02* (2006.01)
*G05F 5/00* (2006.01)
*H02J 3/38* (2006.01)
*H02J 3/14* (2006.01)
*H02J 3/00* (2006.01)

(52) U.S. Cl.
CPC ............... *G05B 15/02* (2013.01); *G05F 5/00* (2013.01); *H02J 3/14* (2013.01); *H02J 3/38* (2013.01); *H02J 3/001* (2020.01); *H02J 2300/28* (2020.01); *H02J 2310/14* (2020.01); *Y02B 10/10* (2013.01); *Y02B 70/30* (2013.01); *Y02B 70/3225* (2013.01); *Y02E 10/56* (2013.01); *Y02E 10/76* (2013.01); *Y04S 20/222* (2013.01); *Y04S 20/242* (2013.01)

(58) Field of Classification Search
None
See application file for complete search history.

(56) References Cited

U.S. PATENT DOCUMENTS

| 4,064,485 A | 12/1977 | Leyde |
| 7,590,472 B2 | 9/2009 | Hakim et al. |

(Continued)

OTHER PUBLICATIONS

P. Palensky et al. "Demand Response with Functional Buildings using Simplified Process Models," pp. 3230-3235, ECON 2011, 37th Annual Conference on IEEE Industrial Electronics Society, Melbourne, VIC, Australia, Nov. 7-10, 2011.

(Continued)

*Primary Examiner* — Sean Shechtman
(74) *Attorney, Agent, or Firm* — Seed IP Law Group, LLP

(57) ABSTRACT

An electrical power grid includes multiple, networked buildings that receive electrical power from one or more power generation sources. A networking control system communicates with a utility control center to obtain information regarding the amount of power being supplied by the power generation sources. The networking control system further obtains information from one or more building automation controllers that are controllably associated with a plurality of networked buildings. The networking control system determines whether the total amount of power being supplied exceeds a total demand load for the plurality of buildings. And if so, the networking control system commands one or more of the building automation controllers to operate one or more of the buildings a reduced energy efficiency level, which may take the form of an optimization curve.

12 Claims, 3 Drawing Sheets

(56) References Cited

U.S. PATENT DOCUMENTS

| | | | |
|---|---|---|---|
| 7,715,951 | B2 | 5/2010 | Forbes, Jr. et al. |
| 8,437,882 | B2 | 5/2013 | Craig et al. |
| 8,583,288 | B1 | 11/2013 | Rossi et al. |
| 2005/0033707 | A1 | 2/2005 | Ehlers et al. |
| 2005/0165511 | A1 | 7/2005 | Fairlie |
| 2007/0271006 | A1 | 11/2007 | Golden et al. |
| 2009/0105888 | A1 | 4/2009 | Flohr |
| 2010/0114385 | A1 | 5/2010 | Dempster et al. |
| 2010/0145534 | A1 | 6/2010 | Forbes, Jr. et al. |
| 2011/0106328 | A1 | 5/2011 | Zhou et al. |
| 2013/0015713 | A1 | 1/2013 | Hagihara |
| 2013/0038122 | A1 | 2/2013 | Broniak |
| 2013/0086404 | A1 | 4/2013 | Sankar et al. |
| 2014/0372164 | A1 | 12/2014 | Egan et al. |
| 2015/0045982 | A1 | 2/2015 | Egan et al. |
| 2015/0293505 | A1 | 10/2015 | Gonzalez |

OTHER PUBLICATIONS

T. Hartman, P.E., "Designing Efficient Systems with the Equal Marginal Performance Principle," ASHRAE Journal, vol. 47, No. 7, pp. 64-70, Jul. 2005.

Amin, S. Massoud et al., "Toward a Smart Grid: Power Delivery for the 21st Century," IEEE Power & Energy Magazine, vol. 3, Issue 5, Sep.-Oct. 2005, pp. 34-41.

| Company | kW/TON | Company | kW/TON | Company | kW/TON | Company | kW/TON |
|---|---|---|---|---|---|---|---|
| COMPANY A | 0.546 | COMPANY 7 | 0.000 | COMPANY M | 0.546 | COMPANY 12 | 0.000 |
| COMPANY B | 0.602 | COMPANY 8 | 0.571 | COMPANY N | 0.602 | NOT COMMISSIONED | 1.639 |
| COMPANY C | 0.570 | COMPANY 9 | 0.432 | COMPANY P | 0.570 | COMPANY 13 | 0.000 |
| COMPANY D | 0.000 | COMPANY E | 0.669 | COMPANY Q | 0.000 | NOT COMMISSIONED | 0.000 |
| COMPANY 1 | 0.469 | COMPANY F | 0.657 | COMPANY R | 0.469 | COMPANY 14 | |
| COMPANY 2 | 0.491 | COMPANY G | 0.701 | COMPANY S | 0.491 | NOT COMMISSIONED | |
| COMPANY 3 | 0.588 | COMPANY H | 0.778 | COMPANY T | 0.588 | COMPANY Z | |
| COMPANY 4 | 0.000 | COMPANY J | 0.000 | COMPANY 10 | 0.000 | NOT COMMISSIONED | |
| COMPANY 5 | 0.689 | COMPANY K | 0.752 | COMPANY 11 | 0.689 | | |
| COMPANY 6 | 0.593 | COMPANY L | 0.373 | | | | |

FIG. 2

SYSTEMS AND METHODS FOR BALANCING AN ELECTRICAL GRID WITH NETWORKED BUILDINGS

CROSS REFERENCE TO RELATED APPLICATION

This application is a continuation of U.S. application Ser. No. 13/543,520 filed Jul. 6, 2012, the entirety of which is hereby incorporated by reference as if fully set forth herein.

FIELD OF THE INVENTION

The present invention generally relates to systems and methods for balancing an electrical power grid with networked buildings, and more specifically to systems and methods for controlling an energy optimization level of the networked building with a network control system.

BACKGROUND OF THE INVENTION

An electric grid is a network of synchronized power providers and consumers connected by transmission and distribution lines and operated by one or more utility control centers. In common parlance, the phrase "power grid" generally refers to a transmission system for electricity. In the continental United States, there are three primary grids: the Eastern Interconnect, the Western Interconnect and the Texas Interconnect. In Alaska and Hawaii, several smaller systems interconnect parts of each state.

On a local or regional level, a local power grid may take the form of one or more power generation sources, various power transmission lines, and power consumers. Conventionally, local power grids have been manually controlled and for various reasons have been susceptible to "brown outs," which is understood to be a reduction or cutback in electric power because of a power generation shortage, a mechanical failure, or unanticipated load requirements by the power consumers.

One newer type of electrical grid is called a smart grid because it increases the connectivity, automation and coordination between the power suppliers, power consumers and the networks that perform either long distance transmission or local distribution tasks. In one form, a smart grid is a digitally enabled electrical grid that gathers, distributes, and acts on information about the behavior of all participants (suppliers and consumers) in order to improve the efficiency, importance, reliability, economics, and sustainability of electricity services.

The term "smart grid" has been in use since about 2005 when the term was popularized in an article that appeared in the September/October issue of IEEE P&E Magazine (Vol. 3, No. 5, pgs 34-41). A common element to most smart grids is the application of digital processing and communications to the power grid, making data flow and information management central to the smart grid.

Smart energy demand describes the energy user component of the smart grid. Smart energy demand is a broad concept that generally includes energy-users actively controlling the pre-heating or pre-cooling of buildings and/or actively reducing their peak demand loads.

Intelligent buildings can help on the demand side of the grid. An "intelligent building" is one equipped with an advanced building automation controller (BAC) that influences energy-relevant equipment and settings like HVAC, lighting or windows; senses energy-relevant information like occupancy, weather, or usage; and contains advanced control algorithms that go beyond plain PID (proportional, integral and derivative control function). See P. Palensky et al., "Demand Response with Functional Buildings using Simplified Process Models," pp. 3230-3235 in IECON 2011—37th Annual Conference on IEEE Industrial Electronics Society, Melbourne, VIC, November 2011 (http://www-.palensky.org/pdf/Palensky2011a.pdf).

Such an advanced BAC can use weather forecasts, learn usage profiles or reschedule the operations of building systems in order to meet smart grid requirements. One key ingredient for operating in such a smart way is to know the dynamic behavior of the building. Model-based control needs such a building model to determine the optimal control strategy. Unfortunately, existing simulation methods and tools are computationally very costly and therefore not suitable for a standard embedded building controller. Id.

Current control strategies for building automation consider the electric grid as a permanent source of energy, which does not constrain consumption at any time. While this still holds true most of the time it is predictable that the situation will change based on two factors: increasing energy consumption and integration of renewable energy sources like photovoltaic systems and wind farms. Id.

Building automation controllers (BAC) today are based on linear control theory implementing P, PI, and PID controllers (i.e., using proportional, integral and differential parts of the input signal) in the field level or even simpler on-off controllers. Information technology has pushed forward the automation and management level, resulting in a broad variety of BAC from different vendors covering all issues including control, monitoring, reporting, and maintenance for various application areas like indoor climate, lighting, security, and safety of persons and buildings. The control mechanisms are composed of a combination of linear control with digital control. A typical control strategy of a system (e.g., a heat pump) defines operation states that are changed based on input values. The implementation of such a control strategy is either done in a programming language or graphically by composing the control strategy out of predefined function blocks. The programmer has to place the blocks (which also include the linear controllers) and connect inputs and outputs. This graphical solution simplifies commissioning, since it is not necessary to debug the control strategy down to the level of single commands (as is necessary with programs). Id.

BRIEF SUMMARY OF THE INVENTION

The present invention is generally directed toward an electrical power grid having multiple, networked buildings that receive electrical power from one or more power generation sources. A networking control system communicates with a utility control center to obtain information regarding the amount of power being supplied by the power generation sources. The networking control system further obtains information from one or more building automation controllers that are controllably associated with a plurality of networked buildings. The networking control system determines whether the total amount of power being supplied exceeds a total demand load for the plurality of buildings. And if so, the networking control system commands one or more of the building automation controllers to operate one or more of the buildings a reduced energy efficiency level, which may take the form of an optimization curve.

In one aspect of the present invention, an electric power grid system includes at least one electrical power generation source; a utility control center in communication with the at least one electrical power generation source; a networking control system in communication with the utility control center to receive data on a total amount of power supplied by the at least one electrical power generation source; and a plurality of buildings, each building having a building automation controller, the controllers in communication with one another and each controller in communication with the networking control system. In one embodiment, the networking control system is operable to compare the total amount of power supplied to a total demand load for the plurality of buildings, and based on the comparison the networking control system is operable to instruct one or more of the building automation controllers to reduce an energy optimization level of its respective building for a period of time.

In another aspect of the invention, a method for controlling a plurality of networked buildings, the method includes the steps of (1) receiving information from a utility control center regarding a total amount of power presently being supplied from one or more power generation sources; (2) communicating with a plurality of building automation controllers regarding information about building power loads for a plurality of networked buildings; (3) determining whether the total amount of power presently being supplied exceeds a total demand from the building power loads; and (4) transmitting instructions to at least one of the building automation controllers to reduce an energy optimization level of at least one of the networked buildings for a period of time.

In yet another aspect of the present invention, a networking control system includes a communications link to a utility control center to obtain information about an amount of power presently being supplied by one or more electrical power generation source; and a communications link to a plurality of building automation controller, the controllers in communication with one another, the controllers operable to adjust an energy optimization level of at least one building of a plurality of networked buildings. And in one embodiment, the networking control system is operable to compare a total amount of the power presently being supplied with a total demand load for the plurality of the networked buildings, and based on the comparison the networking control system is operable to instruct one or more of the building automation controllers to reduce the energy optimization level of the at least one building for a period of time.

BRIEF DESCRIPTION OF THE DRAWINGS

Preferred and alternative embodiments of the present invention are described in detail below with reference to the following drawings:

FIG. 2 is a front plan view of a display screen showing a listing of buildings that are and are not being controlled by the networking control system of FIG. 1 according to an embodiment of the present invention.

DETAILED DESCRIPTION OF THE INVENTION

Figure 1:
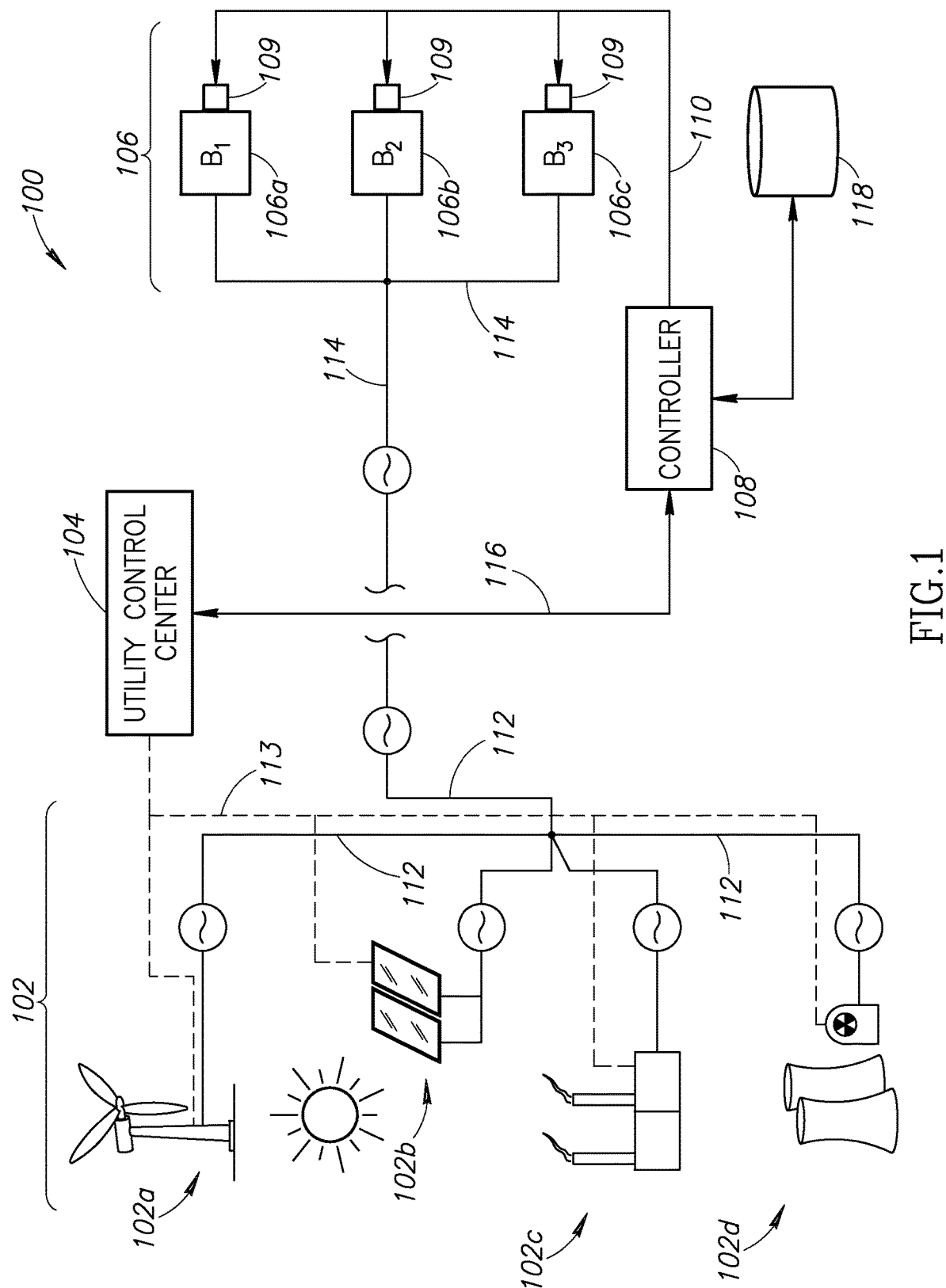
FIG. 1 is a schematic system diagram of an electric power grid having at least one power generation source supplying power to a plurality of buildings that are in communication with a networking control system and a utility control center according to an embodiment of the present invention.

In the following description, certain specific details are set forth in order to provide a thorough understanding of various embodiments of the invention. However, one skilled in the art will understand that the invention may be practiced without these details. In other instances, well-known structures associated with electrical power grids, which may include smart grid systems, HVAC systems, utility control centers, transmission or power lines, building automation controllers, communication networks, various computing and/or processing systems, various HVAC system operational parameters, and methods of operating any of the above with respect to one or more buildings have not necessarily been shown or described in detail to avoid unnecessarily obscuring descriptions of the embodiments of the invention.

In one embodiment of the present invention, an electrical power grid having multiple, networked buildings and one or more power sources may be balanced to minimize inefficiencies and costs on the supply (i.e., source) side of the grid. In general, the balancing of the networked buildings includes controlling an energy optimization level for each building using a networked control system that communicates directly with both a utility control center and the networked buildings. Alternatively stated, the balancing of the grid provides the ability to appropriately and temporally, preferably in real-time, balance the power load demands of the networked buildings vis-à-vis the supply capacities of the power generation sources.

By way of example and looking at the grid over the course of a single day, the demand load for each of the networked buildings will naturally increase or decrease depending on a variety of variables such as, but not limited to, the amount of people in the building and the outside weather conditions. Likewise on the supply side, the power output capacity for the power sources may also vary. For example, wind and solar power sources are dependent on the amount of wind and sun energy available, which naturally changes throughout the day.

In conventional electrical grids, it is common to shut down or deactivate one or more of the power sources when the overall demand loads decrease. Regardless of the power source, there is a cost associated with bringing that power source back online to a full operational capacity. A coal plant for instance will release extra amounts of Carbon Dioxide ($CO_2$) into the atmosphere when being brought back online. A wind turbine will utilize additional energy to overcome the inherent friction in the turbine as the blades begin to rotate, and this is energy that could have been supplied.

Thus, one objective of the present invention is to reduce the load on the grid to prevent a "brown out," which was previously defined as a reduction or cutback in electric power, especially as a result of a shortage, a mechanical failure, or overuse by consumers. Another objective of the present invention is to prevent or eliminate the need to take a power generation source offline, but instead keep it on-line and running at a reduced level (e.g., idling) while any operating efficiencies of the overall grid are dealt with on the demand side (e.g., by adjusting the energy optimization levels for one or more of the networked buildings).

FIG. 1 shows an electrical power grid 100 having a plurality of electrical power generation sources 102, a utility control center 104, a plurality of buildings 106, and a networking control system 108. For purposes of the present description, the buildings 106 are networked (i.e., interconnected) in that environmental control data or other information about the buildings may be obtained from, extracted from, or exchanged with other buildings and the networking control system 108 by way of building automation controllers (BACs) 109. The networking control system 108 may transmit, receive and exchange computer readable instructions or other encoded signals with the BACs 109. The flow of information to/from the BACs 109 and networking control system 108 may be accomplished using a wired or wireless building communication platform 110. In one embodiment, the network control system 108 and the BACs 109 are connected to a local area network or a wide area network, such as the Internet.

The power generation sources 102 may take a variety of forms such as, but not limited to, a wind powered generation source 102a, a solar powered generation source 102b, a coal powered generation source 102c, or a nuclear powered generation source 102d. Likewise, the networked buildings 106 may take a variety of forms such as, but not limited to, an office building 106a, a medical building 106b, or a residential building 106c. For the present description, a building may generally include any structure that utilizes a heating, ventilation and air conditioning (HVAC) system and demands a non-zero electrical load. Likewise, the term "load" generally means an electrical power requirement required by the building's HVAC or lighting system to keep the building in a desired state. As mentioned above, the load required by a particular building often fluctuates throughout the day due to temperature changes, weather changes, time of day (e.g., primary work hours), etc.

On the supply side of the grid, the power generation sources 102 supply electrical power through one or more supply transmission lines 112. The utility control center 104 communicates with the power generation sources 102 by way of a wireless or non-wireless power generation communication platform 113 (shown in dashed lines to distinguish from the transmission lines 112).

On the demand side, the buildings 104 receive the electrical power from demand transmission lines 114, which may interface with or be the same as the supply transmission lines 112. Similarly, the utility control center 104 communicates with the networking control system 108 by way of a wireless or non-wireless communication platform 116. In turn, the networking control system 108 communicates with each of the BACs 109, as described in more detail below.

The BACs 109 receive information from the respective building's HVAC system, lighting system or some other environmental control system (for purposes of brevity hereinafter all the various systems will simply be referred to as the HVAC system). In one embodiment, the BACs 109 include various executable programs for determining a real time operating efficiency, simulating a predicted or theoretical operating efficiency, comparing the same, and then adjusting one or more operating parameters on equipment utilized by a building's HVAC system. In one embodiment the executable programs control variable speed loop cooling plants to establish a decrease or increase of energy usage for the building's HVAC system.

In addition, at least one or more of the executable algorithms employed by the BACs 109 may comport with an equal marginal performance principle such as provided in an article entitled "Designing Efficient Systems with the Equal Marginal Performance Principle," ASHRAE Journal, Vol. 47, No. 7, July 2005, which is incorporated herein by reference in its entirety. Additionally or alternatively, at least one or more of the executable algorithms employed by the BACs 109 may comport with a sequencing control strategy for chillers in an all variable speed chiller plant or some other control strategy that includes adjusting one or more numerical constants associated with the operation of an HVAC system. By way of example, the numerical values may be related to a variety of HVAC system components such as, but not limited to, centrifugal pumps, fans, and variable speed drive centrifugal chillers. In one embodiment, the numerical values are derived and/or adjusted based on the likelihood that more HVAC equipment operates in parallel and on-line near its natural operating curve.

In some embodiments, the BACs 109 may communicate with an all-variable speed system to compensate for changes to equipment or operating conditions automatically, using self-correcting computer executable instructions. The BACs 109, in communication with and with information from the networking control system 108, may advantageously provide an automated technique to replace the current manual tuning methods used to tune the HVAC system for one or more of the networked buildings 106. In other embodiments, the networking control system 108 automatically corrects the operation of the BACs to compensate for changes in HVAC equipment characteristics or external building load characteristics that may be attributed to the building and local climate. In one embodiment, the BACs 109 may include or operate as a self-learning controller as described in U.S. Patent Publication No. 2010/0114385, which is also incorporated by reference in its entirety.

Still referring to FIG. 1, the networking control system 108 communicates with a database 118 that includes information about whether a particular building 106 is in a network that includes the networked buildings 106. By way of example and referring briefly to FIG. 2, the database 118 includes a list of buildings 106 and a corresponding list of real-time demand loads 120 for each building. In one embodiment, the database 118 includes continuously updated information regarding one or more environmental parameters about the plurality of buildings. Such parameters may include, but are not limited to, total building power (e.g., KW), total building load (e.g., tons/BTUh), building efficiencies, power usage, and building temperature. If the particular building is not in the network then it may be identified as "not commissioned." However, other terms or phrases may be used to indicate a non-networked building. In some cases if the building is "not commissioned" then the networking control system 108 will be unable to obtain the demand loads 120, however other buildings may be "not commissioned" and still be able to provide their demand loads 120 through one or more communication platforms.

In one embodiment, the networking control system 108 may include a pricing module configured to determine electric rates of the networked buildings based on a calculated operating efficiency determined during peak and off-peak periods. Based on this, reduced power rates may be offered to networked buildings that permit energy optimization control during certain times.

Figure 3:
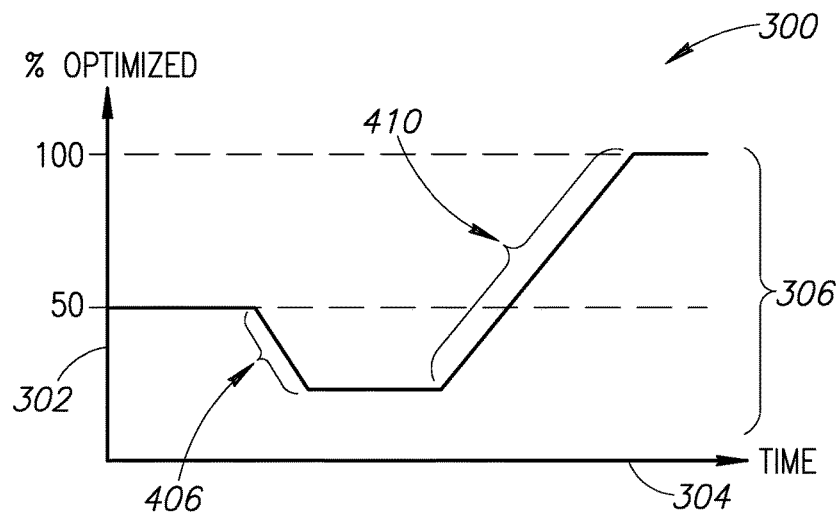
FIG. 3 is an optimization curve showing a method of balancing an electrical power grid with networked buildings according to an embodiment of the present invention.

FIG. 3 shows an energy optimization chart 300 for one of the networked buildings. During the course of a day, for example, the BAC will attempt to keep its respective building at 100% optimized or close thereto, which means a real-time energy efficiency is equal to or substantially equal to a theoretical energy efficiency for the building. Thus, if a building is less than 100% optimized then the building is using more energy than it needs to meet its demand load. Thus on the chart 300, the vertical axis 302 indicates the percentage of optimization for a networked building while the horizontal axis 304 indicates time.

In one embodiment of the invention, the BAC can vary the optimization percentage using one or more of the executable algorithms or control strategies, which have been previously described above. Further, the BAC may be controlled or commanded by the networking control system 108 to follow a particular percentage optimization curve other than 100% optimized, such as an optimization curve 306 as shown in the illustrated embodiment.

By way of example, if there is too much power being supplied by the power sources and the utility control center determines it does not want to bring one or more of the power sources offline, then the networking control system 108 may balance the incoming power over the networked buildings by instructing one or more of the buildings to operate below a 100% optimized level. The building represented by optimization curve 306 is shown operating at a 50% optimization level according to curve 406 to keep one or more of the power sources from having to go completely offline. As needed, the optimization level of the building may be decreased below 50% for a period of time, which may be energy inefficient when it comes to that particular building, but in the aggregate be more energy efficient with respect to the entire grid, especially as compared to bring one or more power sources completely offline. The optimization curve 306 further shows that as the demand loads increase for other networked buildings and/or the power output from one or more of the power sources decreases then the percentage optimization of the represented building may be increased up to the 100% optimization level according to curve 410. This controlled shifting of the optimization curve for each networked building results in a balanced grid capable of smoothly adjusting to the ebbs, flows, peaks and valleys of the supply and demand within the grid.

Figure 4:
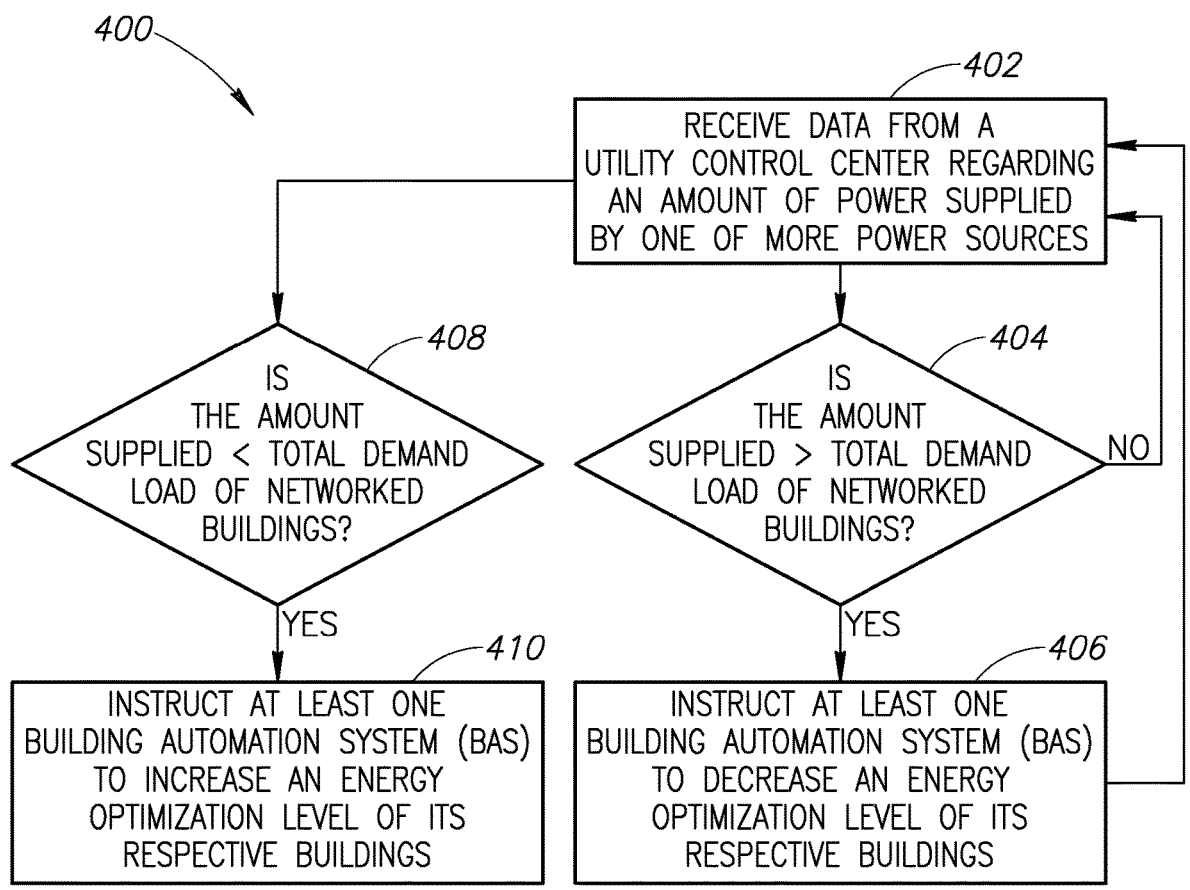
FIG. 4 is a flow diagram of a method for balancing an electrical grid with networked buildings.

Now referring to FIG. 4 and also referring back to FIG. 1, FIG. 4 shows a flow diagram of a method 400 for balancing an electrical grid with networked buildings. At 402, the utility control center 104 receives operating data regarding a total amount of power presently being supplied by one or more of the power generation sources 102. This information is provided to the networking control system 108, which in turn determines whether the total amount of power presently being supplied exceeds a total amount of demand load for the networked buildings 106. If not, then the utility control center 104 continues to monitor the power supplied by the power sources and may also communicate with one or more of the power sources to increase its supplied power output.

However at Step 404, if the total amount of power presently being supplied does exceed the total amount of demand load for the networked buildings 106, then at 406 the networking control system 108 instructs at least one of the BACs 109 to decrease an energy optimization level of its respective building, which is illustrated as the 50% optimization level curve 406 in FIG. 3. The decreased optimization level may follow an optimization curve similar to the one illustrated in FIG. 3. Accordingly, the respective building will operate at a reduced energy efficiency level for an amount of time determined by the networking control system 108, which continually communicates with the utility control center 104. If the building demand loads greatly exceed the total power supplied then multiple BACs may be commanded to control their respective buildings at a sub-optimized level for the same or differing periods of time. At Step 408, if the total amount of power presently being supplied does NOT exceed the total amount of demand load for the networked buildings 106, then at Step 410 the networking control system 108 instructs at least one of the BACs 109 to increase an energy optimization level of its respective building, which is illustrated as the 100% optimization level curve 410 in FIG. 3.

At least one embodiment of the present invention may advantageously prevent brown outs from occurring during high demand cycles, low power supply cycles or some combination of each. In addition, it may advantageously allow excess power to be utilized, albeit more inefficiently, by the networked buildings instead of bringing an entire power source offline. This power management strategy may, in the aggregate and over time, actually save energy and minimize or eliminate unwanted pollutants that may enter the atmosphere during the start-up cycle of certain types of power sources. Other advantages will also be apparent to those of skill in the art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for controlling power consumption of a plurality of networked buildings, each of the networked buildings having a respective optimum power-load demand level and each of the networked buildings being in communication with each other and a utility control center, the method comprising:

receiving information from the utility control center regarding a total amount of power presently available to be supplied by one or more power generation sources to the networked buildings;

receiving information associated with an HVAC system from a plurality of building automation controllers, each associated with one of the networked buildings, characterizing the total power load presently demanded by the networked buildings, each of the building automation controllers being configured to control the HVAC system by adjusting one or more parameters on equipment of the HVAC system, the equipment of the HVAC system including one or more of a heating system, a ventilation system, an air-conditioning system, a lighting system, or an environmental control system;

determining whether the total amount of power presently available to be supplied exceeds the total power load presently demanded; and in response to determining that the total amount of power presently available to be supplied exceeds the total power load presently demanded, transmitting instructions to a building automation controller of the plurality of building automation controllers to cause the power used by the building associated with the building automation controller to exceed the optimum power-load demand level of the building for a predetermined finite period of time, wherein the building automation controller causes the power to exceed the optimum power-load demand level based on:

determining a current operating efficiency of the HVAC system;

simulating a theoretical operating efficiency of the HVAC system based on the current operating efficiency and the instructions to cause the power used by the building to exceed the optimum power-load demand level of the building; and adjusting one or more parameters of the equipment of the HVAC system to exceed the power-load demand level of the building based on the simulated theoretical operating efficiency of the HVAC system.

2. The method of claim 1, further comprising determining a reduced rate pricing structure for networked buildings permitting energy efficiency reduction during selected time periods.

3. The method of claim 1, wherein transmitting instructions includes providing a predetermined optimization curve to be utilized by one or more of the building automation controllers.

4. The method of claim 1, wherein receiving information from the plurality of building automation controllers includes accessing a database having demand load information for at least some of the plurality of buildings.

5. A networking control system comprising:
control circuitry coupled to a plurality of building automation controllers, each of the building automation controllers being associated with one of a plurality of networked buildings, each of the networked buildings having a respective optimum power-load demand level, the building automation controllers being operable to adjust an operating energy efficiency of at least one building of the plurality of networked buildings by controlling at least one HVAC system coupled to the at least one building by causing one or more parameters on equipment of the HVAC system to be adjusted, the equipment of the HVAC system including one or more of a heating system, a ventilation system, an air-conditioning system, a lighting system, or an environmental control system, the control circuitry configured to:
receive information associated with the HVAC system characterizing an amount of power presently available to be supplied by one or more electrical power generation sources to the plurality of networked buildings;
compare the total amount of power presently available to be supplied to the total power load presently demanded by the plurality of networked buildings; and
instruct one or more of the building automation controllers to cause the power used by the building associated with the one or more building automation controllers to exceed the optimum power-load demand level of the building for a predetermined finite period of time when the total amount of power presently available to be supplied is greater than the power load presently demanded by the plurality of networked buildings, wherein to cause the power to exceed the optimum power-load demand level, the at least one building automation controller:
determines a current operating efficiency of the HVAC system;
simulates a theoretical operating efficiency of the HVAC system based on the current operating efficiency and the instructions to cause the power used by the building to exceed the optimum power-load demand level of the building; and
adjusts one or more parameters of the equipment of the HVAC system to exceed the power-load demand level of the building based on the simulated theoretical operating efficiency of the HVAC system.

6. The networking control system of claim 5, further comprising a database having one or more environmental parameters about the plurality of networked buildings.

7. The networking control system of claim 6, wherein the database includes continuously updated information regarding the one or more environmental parameters.

8. The networking control system of claim 5, wherein the operating energy efficiency follows an energy optimization curve determined by the networking control system.

9. A non-transitory computer-readable medium on which are stored instructions that, when executed by a processing device, enable the processing device to perform a method for controlling power consumption of a plurality of networked buildings, each of the networked buildings having a respective optimum power-load demand level and being configured to communicate with each other and with a utility control center, the method comprising:
receiving information from the utility control center regarding a total amount of power presently available to be supplied by one or more power generation sources to the networked buildings;
receiving information associated with an HVAC system from a plurality of building automation controllers, each of the building automation controllers associated with one of the networked buildings, characterizing the total power load presently demanded by the networked buildings, each of the building automation controllers being configured to control the HVAC system by adjusting one or more operating parameters on equipment of the HVAC system, the equipment of the HVAC system including one or more of a heating system, a ventilation system, an air-conditioning system, a lighting system, or an environmental control system;
determining whether the total amount of power presently available to be supplied exceeds the total power load presently demanded; and
in response to determining that the total amount of power presently available to be supplied exceeds the total power load presently demanded, transmitting instructions to a building automation controller of the plurality of building automation controllers to cause the power used by the building associated with the building automation controller to exceed the optimum power-load demand level of the building for a predetermined finite period of time, wherein the building automation controller causes the power to exceed the optimum power-load demand level based on:
determining a current operating efficiency of the HVAC system;
simulating a theoretical operating efficiency of the HVAC system based on the current operating efficiency and the instructions to cause the power used by the building to exceed the optimum power-load demand level of the building; and
adjusting one or more parameters of the equipment of the HVAC system to exceed the power-load demand level of the building based on the simulated theoretical operating efficiency of the HVAC system.

10. The medium of claim 9, wherein the method further comprises determining a reduced rate pricing structure for networked buildings permitting energy efficiency reduction during selected time periods.

11. The medium of claim 9, wherein transmitting instructions includes providing a predetermined optimization curve to be utilized by one or more of the building automation controllers.

12. The medium of claim 9, wherein communicating with the plurality of building automation controllers includes accessing a database having demand load information for at least some of the plurality of buildings.

\* \* \* \* \*